United States Patent
Glöckner et al.

(10) Patent No.: US 7,687,569 B2
(45) Date of Patent: Mar. 30, 2010

(54) RADIATION CURABLE COMPOSITION CONSISTING OF UNSATURATED AMORPHOUS POLYESTERS AND REACTIVE DILUTANT AGENTS

(75) Inventors: Patrick Glöckner, Haltern am See (DE); Andreas Wenning, Nottuln (DE); Peter Denkinger, Nottuln (DE); Erika Retzlaff, Marl (DE)

(73) Assignee: Evonik Degussa GmbH, Essen (DE)

( * ) Notice: Subject to any disclaimer, the term of this patent is extended or adjusted under 35 U.S.C. 154(b) by 240 days.

(21) Appl. No.: 11/631,392

(22) PCT Filed: May 9, 2005

(86) PCT No.: PCT/EP2005/052085
§ 371 (c)(1),
(2), (4) Date: Nov. 21, 2007

(87) PCT Pub. No.: WO2006/003044
PCT Pub. Date: Jan. 12, 2006

(65) Prior Publication Data
US 2008/0146728 A1 Jun. 19, 2008

(30) Foreign Application Priority Data
Jul. 1, 2004 (DE) .................. 10 2004 031 759

(51) Int. Cl.
*C08G 18/42* (2006.01)
*A61K 47/48* (2006.01)

(52) U.S. Cl. ...................... 524/539; 524/419
(58) Field of Classification Search ............ 524/539
See application file for complete search history.

(56) References Cited

U.S. PATENT DOCUMENTS

| | | | |
|---|---|---|---|
| 4,322,504 A * | 3/1982 | Wagner et al. ............. 525/7.1 |
| 6,143,841 A | 11/2000 | Spittka et al. |
| 6,452,003 B1 | 9/2002 | Ewald et al. |
| 6,552,154 B1 | 4/2003 | Kohlstruk et al. |
| 6,613,863 B2 | 9/2003 | Kohlstruk et al. |
| 6,730,628 B2 | 5/2004 | Kohlstruk et al. |
| 6,794,482 B2 | 9/2004 | Gloeckner et al. |
| 6,797,787 B2 | 9/2004 | Scholz et al. |
| 6,800,714 B2 | 10/2004 | Kohnstruk et al. |
| 6,881,785 B2 | 4/2005 | Glöckner et al. |
| 7,001,973 B2 | 2/2006 | Kohlstruk et al. |
| 7,005,002 B2 | 2/2006 | Glöckner et al. |
| 7,033,522 B2 | 4/2006 | Jonderko et al. |
| 7,101,958 B2 | 9/2006 | Gloeckner et al. |
| 7,135,522 B2 | 11/2006 | Gloeckner et al. |
| 7,138,465 B2 | 11/2006 | Gloeckner et al. |
| 7,144,975 B2 * | 12/2006 | Gloeckner et al. .......... 528/302 |
| 7,183,372 B2 | 2/2007 | Andrejewski et al. |
| 7,199,166 B2 | 4/2007 | Gloeckner et al. |
| 2003/0130416 A1 * | 7/2003 | Flosbach et al. ............ 524/801 |
| 2004/0122172 A1 | 6/2004 | Glockner et al. |
| 2005/0010016 A1 | 1/2005 | Glockner et al. |
| 2005/0043501 A1 | 2/2005 | Glockner et al. |
| 2006/0074217 A1 | 4/2006 | Gloeckner et al. |

FOREIGN PATENT DOCUMENTS

| | | |
|---|---|---|
| DE | 953 117 | 11/1956 |
| DE | 2 245 110 | 3/1974 |
| EP | 0 530 402 | 3/1993 |
| EP | 1 398 337 | 3/2004 |
| WO | 03 080703 | 10/2003 |

OTHER PUBLICATIONS

U.S. Appl. No. 12/440,927, filed Mar. 12, 2009, Spyrou, et al.
U.S. Appl. No. 11/993,903, filed Dec. 26, 2007, Spyrou, et al.
U.S. Appl. No. 11/577,415, filed Apr. 18, 2007, Gloeckner, et al.
U.S. Appl. No. 11/574,197, filed Feb. 23, 2007, Gloeckner, et al.
U.S. Appl. No. 11/577,139, filed Apr. 12, 2007, Gloeckner, et al.
U.S. Appl. No. 10/586,587, filed Jul. 20, 2006, Gloeckner, et al.
U.S. Appl. No. 10/588,193, filed Aug. 2, 2006, Gloeckner, et al.
U.S. Appl. No. 11/587,792, filed Oct. 27, 2006, Gloeckner, et al.
U.S. Appl. No. 11/632,303, filed Jan. 12, 2007, Andrejewski, et al.
U.S. Appl. No. 11/573,212, filed Feb. 5, 2007, Gloeckner, et al.
U.S. Appl. No. 11/574,113, filed Feb. 22, 2007, Gloeckner, et al.

(Continued)

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

The invention provides a radiation-curable adhesion-promoting composition comprising unsaturated amorphous polyesters and reactive diluents and a process for preparing it and also provides for the use of unsaturated amorphous polyesters in reactive diluents as adhesion-promoting additives.

33 Claims, No Drawings

OTHER PUBLICATIONS

U.S. Appl. No. 11/577,955, filed Apr. 25, 2007, Gloeckner, et al.
U.S. Appl. No. 12/158,800, filed Jun. 23, 2008, Gloeckner, et al.
U.S. Appl. No. 12/159,097, filed Jun. 25, 2008, Gloeckner, et al.
U.S. Appl. No. 12/159,673, filed Jun. 30, 2008, Gloeckner, et al.
U.S. Appl. No. 12/159,906, filed Jul. 2, 2008, Gloeckner, et al.
U.S. Appl. No. 11/814,306, filed Jul. 19, 2007, Gloeckner, et al.
U.S. Appl. No. 11/917,104, filed Dec. 10, 2007, Vey, et al.
U.S. Appl. No. 11/909,098, filed Sep. 19, 2007, Spyrou, et al.
U.S. Appl. No. 11/911,394, filed Oct. 12, 2007, Becker, et al.

* cited by examiner

RADIATION CURABLE COMPOSITION CONSISTING OF UNSATURATED AMORPHOUS POLYESTERS AND REACTIVE DILUTANT AGENTS

The invention relates to radiation-curable adhesion-promoting compositions comprising unsaturated amorphous polyesters in reactive solvents, to a process for preparing them and to their use, especially as adhesion-promoting additives for radiation-curable adhesives and coating materials.

Radiation-curable coating materials have increasingly gained in importance within recent years, owing to the low VOC (volatile organic compounds) content of these systems. The film-forming components in the coating material are of relatively low molecular mass and hence of low viscosity, so that there is no need for high fractions of organic solvents. Durable coatings are obtained by the formation, following application of the coating material, of a high molecular mass, polymeric network by means of crosslinking reactions initiated, for example, by UV light or by electron beam. Formation of the network results in volume contraction, which is cited in the literature as a reason for the sometimes poor adhesion of radiation-curable coating materials to different substrates [Surface Coatings International Part A, 2003/06, pp. 221-228].

Unsaturated polyester resins (UP resins) are known. They are prepared by condensing saturated and unsaturated dicarboxylic acids or their anhydrides with diols. Their properties depend largely on the identity and proportion of the starting materials.

The carriers of the polymerizable double bonds that are usually used are $\alpha,\beta$-unsaturated acids, primarily maleic acid and/or its anhydride, or fumaric acid; unsaturated diols are of minor importance. The greater the double bond content, i.e., the shorter the distance between the double bonds in the chain molecules, the more reactive the polyester resin. It polymerizes very rapidly, with substantial production of heat and a high level of volume contraction, to give a highly crosslinked end product which, as a result, is comparatively brittle. For this reason the reactive double bonds in the polyester moleculer are "diluted" by incorporating saturated aliphatic or aromatic dicarboxylic acids in the condensation. Straight-chain and/or branched diols are used as alcohol components. The individual types of UP resin differ not only in the components used to prepare them but also in the proportion of saturated to unsaturated acids, which determines the crosslinking density during polymerization, the degree of condensation, i.e., the molar mass, the acid number and OH number, i.e., the nature of the end groups in the chain molecules, the monomer content, and the nature of the additives (Ullmann's Encyclopedia of Industrial Chemistry, VOL A21, p. 217 ff., 1992).

UP resins based on Dicidol as diol component are known for example from DE 953 117, DE 22 45 110, DE 27 21 989, EP 0 114 208, EP 0 934 988.

The use of unsaturated polyester resins for promoting adhesion is known for example from DE 24 09 800, EP 0 114 208 and EP 0 934 988.

DE 953 117 describes a process for preparing unsaturated polyesters which comprises reacting unsaturated dicarboxylic acids with polycyclic, polyhydric alcohols whose hydroxyl groups are distributed over different rings of a ring system which advantageously is a fused ring system. These polyesters can be polymerized with vinyl compounds such as styrene, alkylstyrene, chlorostyrene, vinylnaphthalene and vinyl acetate to give tack-free films. In contrast to the Dicidol mixture used in the present invention and made up of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane, DE 953 117 uses merely an undefined diol with a hypothesized structure, similar to Dicidol. Furthermore, the vinyl compounds optionally used therein are compounds containing only a double bond, but not an acrylic double bond. In the present invention the viscosity is reduced using components which derive from acrylic acid, methacrylic acid and/or derivatives thereof and which with particular preference possess at least two acrylic double bonds. Aromatic vinyl compounds as described in DE 953 117 may have deleterious effects on properties such as, for example, resistance properties, examples being weathering stabilities. As in-depth in-house experiments have shown, moreover, using resin-vinyl monomer compositions as described in DE 953 117, an improvement only in the freedom from tack is achieved. The distinguishing feature of the compounds prepared in the present invention is that the adhesion of coating materials is improved in conjunction with improved corrosion control, greater hardness, improved gloss and polymer content for given coating-material or adhesive viscosity, and also low volume contraction during crosslinking, and effective color stability of the crosslinked polymer.

DE 22 45 110 describes polyester materials made up of unsaturated polyesters, vinyl monomers, activators and adjuvants for producing coatings which can be cured by means of IR radiation, and which are intended to improve the sandability, curing properties and stackability. In addition to the remarks made in relation to DE 953 117, the present invention is concerned with UV- and/or electron-beam-curing adhesive and coating materials systems.

The compounds which are described in DE 27 21 989 are amenable only to crosslinking with amino resins. The polyester framework described therein possesses exclusively saturated character. Crosslinking via free radical polymerization which can be initiated by radiation energy is not a possibility. Moreover it is known that the high fractions of terephthalic acid used in DE 27 21 989 impact negatively on resistance properties such as, for example, weathering stability properties.

The resins claimed in DE-A 102 12 706, EP 0 114 208 and EP 0 934 988 are likewise not suitable for use in radiation-curing coating materials.

WO 89/07622 describes radiation-resistant, acrylstyrene-containing polyesters and polycarbonates, which could contain Dicidol, for the packaging of, for example, foodstuffs such as fruit juices, soft drinks, wine, etc. The unsaturated polyesters on which the present invention is based are free from acylstyryl units and, moreover, are radiation-curing.

Compounds which are likewise not radiation-crosslinking are described in DE 102 05 065. The polyester resins used therein contain, instead of the bis(hydroxymethyl)tricyclopentadiene derivatives used in the present invention, only dicyclopentadiene, which is not amenable to direct esterification. Consequently it is necessary to use reactors for the preparation that are particularly pressure-resistant and are therefore highly priced, which is not advisable from an economic standpoint.

It was an object of the present invention to find an adhesion-promoting composition which enhances properties of radiation-curable adhesives and coating materials, such as the adhesion of coating materials, for example, and at the same time exhibits high corrosion control, high hardness, improved coating gloss and low coating-material viscosity and also a lower volume contraction during crosslinking.

The invention provides a radiation-curable adhesion-promoting composition essentially comprising A) at least one unsaturated amorphous polyester composed of at least one α,β-unsaturated dicarboxylic acid component and an alcohol component, the alcohol component being composed of a Dicidol mixture of the isomeric compounds 3,8-bis(hydroxy-methyl) tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane, where each isomer can be present in the mixture in a fraction of from 20% to 40%, the sum of the three isomers making from 90% to 100% and said mixture being present at not less than 5% in the alcohol component of the polyester; and B) at least one polymerizable solvent (reactive diluent) which contains acrylically or methacrylically unsaturated double bonds.

The invention further provides for the use of compositions comprising unsaturated amorphous polyesters and at least one reactive diluent possessing acrylically and/or methacrylically unsaturated double bonds as radiation-curable adhesion-promoting additives.

It has been found that this composition is universally compatible with further constituents of radiation-curable coating materials and/or adhesives and/or sealants. By way of example the compositions of the invention can be blended with acrylated polyesters, polyacrylates, polyester-urethanes, epoxy acrylates or polyether acrylates and also with alkyd resins, ketone-formaldehyde resins, ketone resins and unsaturated polyesters.

The compositions of the invention can be used for example as binders in radiation-curing coating materials and through free-radical polymerization form corrosion-resistant coatings. The effective adhesion and the capacity to undergo crosslinking reactions predestine the resins of the invention for corrosion control. Additionally there is an improvement in adhesion to different plastics. Besides the increase in adhesion there is also an improvement in the intercoat adhesion to boundary coats situated above and below. A further advantage of the compositions of the invention is their high stability to hydrolysis. Coating materials comprising an additive according to the invention are also notable for high gloss and effective flow.

The radiation-curable adhesion-promoting compositions are used in particular in radiation-curing coating materials, adhesives, lamination systems, printing and other inks, polishes, glazes, pigment pastes, filling compounds, cosmetic articles, packaging materials and/or sealants and insulants, particularly for the purpose of enhancing the adhesion properties and the hardness. They result in very good adhesion properties for different substrates such as, for example, metals, mineral substrates, plastics such as polyethylene, polypropylene or polycarbonate, polymethyl methacrylate and ABS, for example, and also for wood, glass and ceramic.

In the text below the radiation-curable adhesion-promoting compositions of the invention, comprising unsaturated amorphous polyesters and reactive solvents, are described in greater detail.

The unsaturated amorphous polyester resins are obtained by reacting the alcohol component and the acid component.

As the alcohol component use is made in accordance with the invention of a Dicidol mixture of the isomeric compounds 3,8-bis(hydroxymethyl)tricyclo[5.2.1.0$^{2,6}$]decane, 4,8-bis(hydroxy-methyl)tricyclo[5.2.1.026]decane and 5,8-bis(hydroxymethyl)tricyclo[5.2.1.026]decane, where each isomer can be present in the mixture in a fraction of from 20% to 40%, where three isomers making from 90% to 100%, preferably from 95% to 100% and said mixture being present at not less than 5% in the alcohol component of the polyester. The isomer content of the Dicidol mixture can be determined qualitatively and quantitatively by means, for example, of GC analysis or quantitatively by separation by means of preparative GC or HPLC with subsequent NMR spectroscopy. All of the corresponding isomers of Dicidol in position 9 are suitable in exactly this way, but owing to the mirror symmetry of the aforementioned isomers, such as the cis and trans isomers as well, they cannot be distinguished under normal circumstances in practice.

The Dicidol mixture may further contain up to 10% of other isomers of Dicidol and/or trimeric and/or higher isomeric diols of the Diels-Alder reaction product of cyclopentadiene. With preference the alcohol component is composed of 20%, 50%, preferably 90%, more preferably 100% Dicidol mixture, this mixture with particular preference including from 95% to 100% of the abovementioned three isomeric compounds.

Besides the Dicidol mixture the alcohol component may comprise further linear and/or branched, aliphatic and/or cycloaliphatic and/or aromatic diols and/or polyols. Preferred additional alcohols used are ethylene glycol, 1,2- and/or 1,3-propanediol, diethylene, dipropylene, triethylene or tetraethylene glycol, 1,2- and/or 1,4-butanediol, 1,3-butylethylpropanediol, 1,3-methylpropanediol, 1,5-pentanediol, cyclohexanedimethanol, glycerol, hexanediol, neopentyl glycol, trimethylolethane, trimethylolpropane and/or pentaerythritol and also bisphenol A, B, C and/or F, norbornylene glycol, 1,4-benzyldimethanol and -diethanol, and 2,4-dimethyl-2-ethylhexane-1,3-diol.

The unsaturated amorphous polyester resins contain as starting acid component at least one α,β-unsaturated dicarboxylic acid. Preferably the unsaturated polyester resins contain citraconic, fumaric, itaconic, maleic and/or mesaconic acid.

It is also possible in addition for aromatic and/or aliphatic and/or cycloaliphatic monocarboxylic and/or dicarboxylic and/or polycarboxylic acids to be present, such as phthalic acid, isophthalic acid, terephthalic acid, 1,4-cyclohexanedicarboxylic acid, succinic acid, sebacic acid, methyltetrahydrophthalic, methylhexahydrophthalic, hexahydrophthalic and tetrahydrophthalic acid, dodecanedioic acid, adipic acid, azelaic acid, isononanoic acid, 2-ethylhexanoic acid, pyromellitic acid and/or trimellitic acid, for example. Preference is given to phthalic acid, hexahydrophthalic acid, tetrahydrophthalic acid, adipic and/or azelaic acid.

The acid component may be composed in whole or in part of anhydrides and/or alkyl esters, preferably methyl esters.

Generally speaking the alcohol component is present in a molar ratio of from 0.5 to 2.0:1 with respect to the acid component, preferably from 0.8 to 1.5:1. With particular preference the reaction of the alcohol component takes place in a molar ratio of from 1.0 to 1.1:1 with respect to the acid component.

The unsaturated amorphous polyesters can have an acid number of between 1 and 200 mg KOH/g, preferably between 1 and 100, more preferably between 1 and 50 mg KOH/g, and also an OH number of between 1 and 200 mg KOH/g, preferably between 1 and 100 and more preferably between 1 and 50 mg KOH/g.

The Tg of the unsaturated amorphous polyesters varies from −30 to +80° C., preferably from −20 to +50° C., more preferably from −10 to +40° C.

In one preferred embodiment I the unsaturated polyesters (UP resins) are composed of an alcohol component with at least 90%, preferably 95%, more preferably 100% of the Dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]-decane and of fumaric acid and/or maleic acid (anhydride). In another preferred embodiment II the polyesters comprise the abovementioned starting components as under I with, additionally, a further acid selected from adipic acid, dodecanedioic acid and phthalic acid (anhydride), where the ratio of the α,β-unsaturated acid(s) to the additional acid can vary from 2:1 to 1:4. Preferred ratios are from about 1:1 to 1:2. These polyesters generally have acid numbers of from 1 to 200 mg KOH/g, preferably 1-100 mg KOH/g, more preferably 1-50 mg KOH/g, OH numbers of from 1 to 200 mg KOH/g, preferably 1-100 mg KOH/g, more preferably 1-50 mg KOH/g, and a Tg of from −30 to +80° C., preferably from −20 to +50° C., more preferably from −10 to +40° C.

Preferred reactive solvents (reaction diluents) are acrylic acid and/or methacrylic acid, $C_1$-$C_{40}$ alkyl esters and/or cycloalkyl esters of methacrylic acid and/or acrylic acid, glycidyl methacrylate, glycidyl acrylate, 1,2-epoxybutyl acrylate, 1,2-epoxybutyl methacrylate, 2,3-epoxycyclopentyl acrylate, 2,3-epoxycyclopentyl methacrylate, and the analogous amides, it being possible also for styrene and/or derivatives thereof to be present to a minor extent.

Particular preference is given to phenoxyethyl acrylate, ethoxyethoxyethyl acrylate, isodecyl acrylate and isobornyl acrylate.

Another preferred class of radiation-reactive solvents (reactive diluents) comprises di-, tri- and/or tetraacrylates and their methacrylic analogues, which result formally from the reaction products of acrylic and/or methacrylic acid with an alcohol component, with elimination of water. As the alcohol component which is customary for this purpose use is made, for example, of ethylene glycol, 1,2-, 1,3-propanediol, diethylene, di- and tripropylene, triethylene and tetraethylene glycol, 1,2-, 1,4-butanediol, 1,3-butylethylpropanediol, 1,3-methylpropanediol, 1,5-pentanediol, 1,4-bis(hydroxymethyl)cyclohexane (cyclohexanedimethanol), glycerol, hexanediol, neopentyl glycol, trimethylolethane, trimethylolpropane, pentaerythritol, bisphenol A, B, C and F, norbornylene glycol, 1,4-benzyldimethanol, 1,4-benzyldiethanol, 2,4-dimethyl-2-ethylhexane-1,3-diol, 1,4- and 2,3-butylene glycol, di-β-hydroxyethylbutanediol, 1,5-pentanediol, 1,6-hexanediol, 1,8-octanediol, decanediol, dodecanediol, neopentyl glycol, cyclohexanediol, trimethylolpropane, 3(4), 8(9)β-bis(hydroxymethyl)tricyclo[5.2.1.0$^{2,6}$]decane, 2,2-bis(4-hydroxycyclohexyl)propane, 2,2-bis[4-(B-hydroxyethoxy)phenyl]propane, 2-methylpropane-1,3-diol, 2-methylpentane-1,5-diol, 2,2,4(2,4,4)-trimethylhexane-1,6-diol, hexane-1,2,6-triol, butane-1,2,4-triol, tris(β-hydroxyethyl)isocyanurate, mannitol, sorbitol, polypropylene glycols, polybutylene glycols, xylylene glycol or neopentyl glycol hydroxypivalate, alone or in mixtures.

Particular preference is given, however, to dipropylene glycol diacrylate (DPGDA) and/or tripropylene glycol diacrylate (TPGDA), hexanediol diacrylate (HDDA), trimethylolpropane triacrylate, alone or in a mixture.

Generally speaking, though, it is possible to use all of the reactive diluents specified in the literature as suitable for radiation-curable coating materials.

The compositions of the invention may also comprise auxiliaries and adjuvants such as, for example, inhibitors, water and/or organic solvents, neutralizing agents, surfactants, oxygen scavengers and/or free-radical scavengers, catalysts, light stabilizers, color brighteners, photoinitiators, photosensitizers, thixotropic agents, antiskinning agents, defoamers, antistats, thickeners, thermoplastic additives, dyes, pigments, flame retardants, internal release agents, fillers and/or blowing agents.

The compositions of the invention are prepared by (semi)continuous or batchwise esterification and condensation of the starting acids and starting alcohols in a single-stage or multistage regime and subsequent mixing with the reactive diluents in a continuous or batchwise regime.

The invention also provides a process for preparing radiation-curable adhesion-promoting compositions comprising
A) at least one unsaturated amorphous polyester composed of at least one α,β-unsaturated dicarboxylic acid component and an alcohol component, the alcohol component being composed of a Dicidol mixture of the isomeric compounds 3,8-bis (hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane, where each isomer can be present in the mixture in a fraction of from 20% to 40%, the sum of the three isomers making from 90% to 100% and said mixture being present at not less than 5% in the alcohol component of the polyester; and
B) at least one polymerizable solvent (reactive diluent) which contains acrylically or methacrylically unsaturated double bonds, by reacting the starting components of A) at a temperature of from 150 to 270° C., preferably from 160 to 230° C., more preferably from 160 to 200° C. and subsequently diluting the reaction product with a reactive diluent B) at temperatures below 200° C., preferably below 180° C., more preferably below 160° C.

The examples which follow are intended to illustrate the invention though not to restrict its scope of application.

EXAMPLES

Starting component Dicidol mixture in an isomer ratio of approximately 1:1:1.

Example 1

Dodecanedioic acid and fumaric acid (ratio 0.6:0.4) are reacted with Dicidol in a ratio of 1:1.05 at 180° C. under a nitrogen atmosphere until the acid number is 24 mg KOH/g and the OH number is 34 mg KOH/g. For this purpose the fumaric acid is first esterified with Dicidol for an hour and then the dodecanedioic acid is added. The resin is dissolved to 50% strength in TPGDA. $M_n$=2200 g/mol $M_w$=5500 g/mol, glass transition temperature 4° C.

Use Example

The base resin used (UV20) was an adduct of trimethylolpropane, isophorone diisocyanate, Terathane 650 and hydroxyethyl acrylate as a 70% strength solution in TPGDA with a viscosity at 23° C. of 20.9 Pas.

| Formulation | A | B |
|---|---|---|
| UV 20 | 100 g | 100 g |
| Resin from example 1 | — | 100 g |
| TPGDA | 16.7 g | 4 g |

The resin solutions A and B were admixed with Darocur 1173 (Ciba Specialty Chemicals, 1.5% based on resin solids)

and applied using a coating bar to a glass plate and also to Bonder metal panels. The films were then cured by means of UV light (medium-pressure mercury lamp, 70 W/350 nm optical filter) for about 16 seconds. The films, soluble beforehand, are no longer soluble in methyl ethyl ketone.

| Coating material | CT [µ] | EC [mm] | HK [s] | Peugeot Test | MEK Test [double rubs] |
|---|---|---|---|---|---|
| A | 29-34 | 7 | 115 | ++ | >100 |
| B | 33-36 | 7 | 148 | ++ | >150 |

Crosshatch Testing on Different Substrates

| Coating material | ABS | PC | PE | PP | PS | Metal |
|---|---|---|---|---|---|---|
| A | 1 | 4 | 4 | 5 | 4 | 2 |
| B | 0 | 0 | 2 | 2 | 1 | 0 |

0 = no delamination;
5 = complete loss of adhesion
ABS: acrylonitrile-butadiene-styrene terpolymer
PC: polycarbonate
PE: polyethylene
PP: polypropylene
PS: polystyrene
CT: Coatings thickness
EC: Erichsen cupping test
HK: Pendulum Hardness (König)

What is claimed is:

1. A radiation-curable adhesion-promoting composition essentially comprising
    A) at least one unsaturated amorphous polyester composed of at least one α,β-unsaturated dicarboxylic acid component and an alcohol component, the alcohol component being composed of a dicidol mixture of the isomeric compounds 3,8-bis(hydroxymethyl)tricyclo[5.2.1.0$^{2.6}$]decane, 4,8-bis(hydroxymethyl)tricyclo[5.2.1.0$^{2.6}$]decane and 5,8-bis(hydroxymethyl)tricyclo[5.2.1.0$^{2.6}$]decane, where each isomer can be present in the mixture in a fraction of from 20 to 40 mol %, the sum of the three isomers making from 90 to 100 mol % and said mixture being present at not less than 5 mol % in the alcohol component of the polyester; and
    B) at least one polymerizable solvent (reactive diluent) which contains acrylically or methacrylically unsaturated double bonds.

2. A radiation-curable adhesion-promoting composition of claim 1, comprising up to 10 mol % of other isomers of dicidol and/or trimeric and/or higher isomeric diols of the Diels-Alder reaction product of cyclopentadiene.

3. A radiation-curable adhesion-promoting composition of claim 1, wherein the acid component further comprises aromatic and/or aliphatic and/or cycloaliphatic monocarboxylic and/or dicarboxylic and/or polycarboxylic acids.

4. A radiation-curable adhesion-promoting composition of claim 1, wherein the acid component is composed in whole or in part of anhydrides and/or alkyl esters.

5. A radiation-curable adhesion-promoting composition of claim 1, wherein the alcohol component comprises further linear and/or branched, aliphatic and/or cycloaliphatic and/or aromatic diols and/or polyols.

6. A radiation-curable adhesion-promoting composition of claim 1, comprising citraconic, fumaric, itaconic, maleic and/or mesaconic acid as α,β-unsaturated dicarboxylic acid.

7. A radiation-curable adhesion-promoting composition of claim 1, comprising phthalic acid, isophthalic acid, terephthalic acid, 1,4-cyclohexanedicarboxylic acid, succinic acid, sebacic acid, methyltetrahydrophthalic, methylhexahydrophthalic acid, hexahydrophthalic acid, tetrahydrophthalic acid, dodecanedioic acid, adipic acid, azelaic acid, pyromellitic acid and/or trimellitic acid, their acid anhydrides and/or methyl esters, as additional acids, and also isononanoic acid and/or 2-ethylhexanoic acid, alone or in mixtures.

8. A radiation-curable adhesion-promoting composition of claim 1, comprising ethylene glycol, 1,2- and/or 1,3-propanediol, diethylene, dipropylene, triethylene and/or tetraethylene glycol, 1,2- and/or 1,4-butanediol, 1,3-butylethylpropanediol, 1,3-methylpropanediol, 1,5-pentanediol, cyclohexanedimethanol, glycerol, hexanediol, neopentyl glycol, trimethylolethane, trimethylolpropane and/or pentaerythritol, bisphenol A, B, C and/or F, norbornylene glycol, 1,4-benzyldimethanol and -diethanol, 2,4-dimethyl-2-ethylhexane-1,3-diol as additional alcohols, alone or in mixtures.

9. A radiation-curable adhesion-promoting composition, wherein the alcohol component is composed of at least 20 mol % of the isomers according to claim 1.

10. A radiation-curable adhesion-promoting composition, wherein the alcohol component is composed of at least 50 mol % of the isomers according to claim 1.

11. A radiation-curable adhesion-promoting composition, wherein the alcohol component is composed of at least 90 mol % of the isomers according to claim 1.

12. A radiation-curable adhesion-promoting composition, wherein the alcohol component is composed of at least 100 mol % of the isomers according to claim 1.

13. A radiation-curable adhesion-promoting composition of claim 1, comprising fumaric acid and/or maleic acid (anhydride) as α,β-unsaturated acid component.

14. A radiation-curable adhesion-promoting composition of claim 1, comprising adipic acid and/or phthalic acid (anhydride) as further dicarboxylic acid component.

15. A radiation-curable adhesion-promoting composition of claim 1, comprising the alcohol component in a molar ratio of from 0.5 to 2.0:1 with respect to the acid component.

16. A radiation-curable adhesion-promoting composition of claim 1, comprising the alcohol component in a molar ratio of from 0.8 to 1.5:1 with respect to the acid component.

17. A radiation-curable adhesion-promoting composition of claim 1, comprising the alcohol component in a molar ratio of from 1.0 to 1.1:1 with respect to the acid component.

18. A radiation-curable adhesion-promoting composition of claim 1, having an acid number of between 1 and 200 mg KOH/g.

19. A radiation-curable adhesion-promoting composition of claim 1, having an OH number of between 1 and 200 mg KOH/g.

20. A radiation-curable adhesion-promoting composition of claim 1, comprising acrylic acid and/or methacrylic acid, $C_1$-$C_{40}$ alkyl esters and/or cycloalkyl esters of methacrylic acid and/or acrylic acid, glycidyl methacrylate, glycidyl acrylate, 1,2-epoxybutyl acrylate, 1,2-epoxybutyl methacrylate, 2,3-epoxycyclopentyl acrylate, 2,3-epoxycyclopentyl methacrylate, and also the analogous amides and/or styrene and/or derivatives thereof, alone or in mixtures, as component B) (reactive diluent(s)).

21. A radiation-curable adhesion-promoting composition of claim 1, comprising phenoxyethyl acrylate, ethoxyethoxyethyl acrylate, isodecyl acrylate and isobornyl acrylate, alone or in mixtures, as component B) (reactive diluent(s)).

22. A radiation-curable adhesion-promoting composition of claim 1, comprising di-, tri- and/or tetraacrylates and their methacrylate analogues, alone or in mixtures, as component B) (reactive diluent(s)).

23. A radiation-curable adhesion-promoting composition of claim 1, comprising di-, tri- and/or tetraacrylates and their methacrylate analogues of ethylene glycol, 1,2-, 1,3-propanediol, diethylene, di- and tripropylene, triethylene and tetraethylene glycol, 1,2-, 1,4-butanediol, 1,3-butylethylpropanediol, 1,3-methylpropanediol, 1,5-pentanediol, 1,4-bis(hydroxymethyl)cyclohexane (cyclohexane-dimethanol), glycerol, hexanediol, neopentyl glycol, trimethylolethane, trimethylolpropane, pentaerythritol, bisphenol A, B, C and F, norbornylene glycol, 1,4-benzyldimethanol and -diethanol, 2,4-dimethyl-2-ethylhexane- 1,3-diol, 1,4- and 2,3-butylene glycol, di-β-hydroxyethylbutanediol, 1,5-pentanediol, 1,6-hexanediol, 1,8-octanediol, decanediol, dodecanediol, neopentyl glycol, cyclohexanediol, trimethylolpropane, 3(4),8(9)-bis (hydroxymethyl)tricyclo [$5.2.1.0^{2,6}$]decane, 2,2-bis (4-hydroxycyclohexyl)propane, 2,2-bis [4-(B-hydroxyethoxy)phenyl]propane, 2-methyipropane- 1,3-diol, 2-methylpentane- 1,5-diol, 2,2,4(2,4,4)-trimethylbexane- 1,6-diol, hexane- 1,2,6-triol, butane-1,2,4-triol, tris(β-hydroxyethyl) isocyanurate, mannitol, sorbitol, polypropylene glycols, polybutylene glycols, xylylene glycol or neopentyl glycol hydroxypivalate, alone or in mixtures, as component B) (reactive diluent(s)).

24. A radiation-curable adhesion-promoting composition of claim 1, comprising di- and/or tripropylene glycol diacrylate, hexanediol diacrylate, trimethylolpropane triacrylate, alone or in a mixture.

25. A radiation-curable adhesion-promoting composition of claim 1, comprising auxiliaries and adjuvants.

26. A radiation-curable adhesion-promoting composition of claim 1, comprising auxiliaries and adjuvants selected from inhibitors, water and/or organic solvents, neutralizing agents, surfactants, oxygen scavengers and/or free-radical scavengers, catalysts, light stabilizers, color brighteners, photosensitizers, and photoinitiators, thixotropic agents, antiskinning agents, defoamers, antistats, thickeners, thermoplastic additives, dyes, pigments, flame retardants, internal release agents, fillers and/or blowing agents.

27. A radiation-curable adhesion-promoting composition, wherein the alcohol component is composed of at least 90 mol % of dicidol mixture according to claim 1 and comprises fumaric acid and/or maleic acid (anhydride) in a diol/acid ratio of from 0.9 to 1.1:1.

28. A radiation-curable adhesion-promoting composition, further comprising dodecanedioic acid, adipic acid and/or phthalic acid (anhydride) as acid component in a ratio of α,β-unsaturated acid(s) to additional acid of from 3:1 to 1:4.

29. A process for preparing a radiation-curable adhesion-promoting composition, said composition comprising
A) at least one unsaturated amorphous polyester composed of at least one α,β-unsaturated dicarboxylic acid component and an alcohol component, the alcohol component being composed of a dicidol mixture of the isomeric compounds 3,8-bis(hydroxy-methyl)tricyclo [$5.2.1.0^{2,6}$]decane, 4,8-bis(hydroxymethyl)tricyclo [$5.2.1.0^{2,6}$]decane and 5,8-bis (hydroxymethyl)tricyclo [$5.2.1.0^{2,6}$]decane, where each isomer can be present in the mixture in a fraction of from 20 to 40 mol %, the sum of the three isomers making from 90 to 100 mol % and said mixture being present at not less than 5 mol % in the alcohol component of the polyester; and
B) at least one polymerizable solvent (reactive diluent) which contains acrylically or methacrylically unsaturated double bonds,
said process comprising
reacting the starting components of A) at a temperature of from 150 to 270° C., and subsequently diluting the reaction product with a reactive diluent B) at temperatures below 200° C.

30. A method comprising adding unsaturated amorphous polyesters A) and at least one polymerizable solvent (reactive diluent) B), as a radiation-curable adhesion-promoting additive, to radiation-curable coating materials.

31. The method of claim 30, wherein said radiation-curable coating materials comprise water and/or solvents or are free from organic solvents and/or water.

32. The method of claim 31, wherein said radiation-curable coating materials are selected from the group consisting of coating materials, adhesives, lamination systems, printing and other inks, polishes, glazes, pigment pastes, filling compounds, cosmetics articles, packaging materials, sealants and insulants.

33. The method of claim 32, wherein said radiation-curable coating materials are applied to metallic or mineral substrates, wood, paper, plastic, ceramic or glass.

* * * * *